US010599213B2

(12) United States Patent
Yang et al.

(10) Patent No.: US 10,599,213 B2
(45) Date of Patent: Mar. 24, 2020

(54) METHOD FOR REMOTELY CONTROLLING VIRTUAL CONTENT AND APPARATUS FOR THE SAME

(71) Applicant: Electronics and Telecommunications Research Institute, Daejeon (KR)

(72) Inventors: Ung-Yeon Yang, Daejeon (KR); Ki-Hong Kim, Sejong-si (KR); Jin-Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 15/981,526

(22) Filed: May 16, 2018

(65) Prior Publication Data
US 2018/0356879 A1 Dec. 13, 2018

(30) Foreign Application Priority Data
Jun. 9, 2017 (KR) ........................ 10-2017-0072348

(51) Int. Cl.
*G09G 5/00* (2006.01)
*G06F 3/01* (2006.01)
(52) U.S. Cl.
CPC .................... *G06F 3/011* (2013.01)
(58) Field of Classification Search
CPC . G06F 3/01; G06F 3/011; G06F 3/017; G06F 3/0481; G06F 3/04815;
(Continued)

(56) References Cited

U.S. PATENT DOCUMENTS 6,195,104 B1 * 2/2001 Lyons ................ H04N 5/23219
345/473
7,804,507 B2 9/2010 Yang et al.
(Continued)

FOREIGN PATENT DOCUMENTS

KR 100641654 B1 11/2006
KR 1020120117104 A 10/2012
(Continued)

OTHER PUBLICATIONS

Shunsuke Yoshimoto et al., "Haptic canvas: dilatant fluid based haptic interaction," Proceeding SIGGRAPH '10 ACM SIGGRAPH 2010 Emerging Technologies, Jul. 25-29, 2010, Article No. 13, ISBN: 978-1-4503-0392-7, Los Angeles, California.

*Primary Examiner* — Joe H Cheng
(74) *Attorney, Agent, or Firm* — William Park & Associates Ltd.

(57) ABSTRACT

Disclosed herein are a method for remotely controlling virtual content and an apparatus for the method. The method for remotely controlling virtual content includes acquiring spatial data about a virtual space, creating at least one individual space by transforming the virtual space in accordance with a user interaction area that corresponds to a user based on the spatial data, visualizing the at least one individual space in the user interaction area and providing an interactive environment which enables an interaction between the user's body and a virtual object included in the at least one individual space, and controlling the virtual object in response to a user interaction event occurring in the interactive environment.

18 Claims, 8 Drawing Sheets

(58) Field of Classification Search
CPC ........ G06F 3/0484; G09G 5/377; G09B 9/00; G06T 19/006; G06T 19/20; H04N 13/279
See application file for complete search history.

(56) References Cited

U.S. PATENT DOCUMENTS

| | | | |
|---|---|---|---|
| 9,384,594 B2 | 7/2016 | Maciocci et al. | |
| 9,682,319 B2* | 6/2017 | Zalewski | A63F 13/10 |
| 2002/0065090 A1* | 5/2002 | Ohba | H04B 7/18582 |
| | | | 455/503 |
| 2006/0252541 A1* | 11/2006 | Zalewski | A63F 13/02 |
| | | | 463/36 |
| 2007/0126733 A1* | 6/2007 | Yang | G06F 3/011 |
| | | | 345/419 |
| 2008/0024597 A1* | 1/2008 | Yang | A63F 13/02 |
| | | | 348/53 |
| 2008/0191864 A1* | 8/2008 | Wolfson | G06F 3/011 |
| | | | 340/524 |
| 2012/0122062 A1* | 5/2012 | Yang | G09B 9/00 |
| | | | 434/219 |
| 2012/0146894 A1* | 6/2012 | Yang | G09B 5/06 |
| | | | 345/156 |
| 2013/0222427 A1 | 8/2013 | Heo et al. | |
| 2013/0225305 A1* | 8/2013 | Yang | A63F 13/00 |
| | | | 473/152 |
| 2015/0193979 A1* | 7/2015 | Grek | G06F 1/1694 |
| | | | 345/633 |
| 2015/0328082 A1* | 11/2015 | Jiang | A61H 19/00 |
| | | | 600/38 |
| 2016/0342303 A1 | 11/2016 | Van Wie et al. | |
| 2017/0200313 A1* | 7/2017 | Lee | G06T 19/006 |
| 2017/0237789 A1* | 8/2017 | Harner | G06F 3/011 |
| | | | 709/205 |
| 2018/0059812 A1* | 3/2018 | Inomata | G06F 3/0346 |
| 2018/0095635 A1* | 4/2018 | Valdivia | G02B 27/0093 |
| 2018/0181367 A1* | 6/2018 | Goi | G06F 1/163 |
| 2018/0253902 A1* | 9/2018 | Inomata | G06T 19/006 |

FOREIGN PATENT DOCUMENTS

| | | |
|---|---|---|
| KR | 101360888 B1 | 2/2014 |
| KR | 101527993 B1 | 6/2015 |
| KR | 1020160084502 A | 7/2016 |

* cited by examiner

METHOD FOR REMOTELY CONTROLLING VIRTUAL CONTENT AND APPARATUS FOR THE SAME

CROSS REFERENCE TO RELATED APPLICATION

This application claims the benefit of Korean Patent Application No. 10-2017-0072348, filed Jun. 9, 2017, which is hereby incorporated by reference in its entirety into this application.

BACKGROUND OF THE INVENTION

1. Technical Field

The present invention relates generally to technology for remotely controlling virtual content, and more particularly, to a method for remotely controlling virtual content and an apparatus for the method, which can control virtual content by providing an environment that enables natural interaction between the body of a real user who uses an interface device, such as a Virtual Reality (VR), Augmented Reality (AR), or Mixed Reality (MR) interface, and a virtual object.

2. Description of the Related Art

Technology for propagating a Head-Mounted Display (HMD), which presents high-level visual immersion corresponding to a viewing angle of about 100 degrees, to the public at low cost was developed around 2012, and thus HMD has led the new renaissance of current virtual reality technology.

In order to increase satisfaction with realism of virtual reality content experienced by a user, virtual-reality technology requires an interface for supporting various senses from the standpoint of hardware. Recently, the number of cases in which related technology has been stabilized and trial products (prototypes) have been released by startup enterprises has increased. For example, there are a camera-based tracking system for tracking the location of a user, a device for tracking the motion of the whole body of the user or tracking the precise posture and direction of the user's head, hand or finger, and the like. Further, there has been introduced interface technology for outputting sounds and emitting odors, which can present a three-dimensional (3D) artificial spatial sense, together with haptic technology which represents and recognizes a virtual physical force.

Furthermore, for augmented and mixed reality technology, application technology has been developed in such a way as to add artificial content information and perform a task suiting a specific purpose, based on the recognition of information about the environment and objects of images acquired from a camera, or in such a way as to mix an optically combined transflective image with a real space and execute a specific event, as in the case of a pseudo-hologram stage.

In this way, virtual reality (VR), augmented reality (AR), and mixed reality (MR) technologies lay emphasis on the implementation of hardware- and software-centered unit functions based on a content experience scenario. In academic and research fields, in which research into future technology is proactively being conducted, it is recommended that suitable feedback for a human cognitive process should be naturally provided from the standpoint of a human factor in order for a user to acquire an ideal experience (i.e. presence) through a VR, AR, or MR system.

However, since current hardware and software technology cannot reproduce a perfect feedback effect to such an extent that it becomes impossible to distinguish reality from virtuality using the human senses, technology for adjusting controllable elements of hardware and software based on human cognitive characteristics in reality has been investigated and developed. Representative research that has been conducted for the same purposes as such technology may be an interactive technology field in which research is conducted into a method of presenting suitable feedback while optimizing the conditions of a content scenario, a user, and a hardware environment.

PRIOR ART DOCUMENTS

Patent Document

Korean Patent Application Publication No. 10-2012-0117104 (Date of Publication: Oct. 24, 2012, entitled "virtual reality treadmill")

SUMMARY OF THE INVENTION

Accordingly, the present invention has been made keeping in mind the above problems occurring in the prior art, and an object of the present invention is to enhance the immersion of users who participate in content depending on virtual reality, augmented reality, and mixed reality from a remote place, thus improving service quality and the satisfaction of users.

Another object of the present invention is to provide an environment in which a user may intuitively manipulate a virtual object based on multi-sensory information presented around the user.

A further object of the present invention is to provide a sensation such that a field (local) user, who uses virtual content in a field, and a remote user have the impression of using the virtual content in the same space through a motion platform for the virtual content.

Yet another object of the present invention is to provide interactive technology, which can provide convenience to a user so that a separate learning process for new technology or a new interface is not required in order to use virtual content.

In accordance with an aspect of the present invention to accomplish the above objects, there is provided a method for remotely controlling virtual content, including acquiring spatial data about a virtual space; creating at least one individual space by transforming the virtual space in accordance with a user interaction area that corresponds to a user based on the spatial data; visualizing the at least one individual space in the user interaction area and providing an interactive environment which enables an interaction between the user's body and a virtual object included in the at least one individual space; and controlling the virtual object in response to a user interaction event occurring in the interactive environment.

The user interaction area may be an intersection area between a user-workable area in which the user's body is taken into consideration and a displayable range of a wearable display worn by the user.

Providing the interactive environment may be configured to cause the at least one individual space to be included in the user-workable area and visualize a portion of the at least one individual space corresponding to the intersection area.

Providing the interactive environment may be configured to provide the interactive environment based on a multimodal interaction scheme using the user's body.

Providing the interactive environment may include comparing a size of the user's body with a size of the virtual object; and if it is determined that a virtual interaction tool is required as a result of comparing the size of the user's body with the size of the virtual object, providing a virtual interaction tool corresponding to the size of the virtual object to the user interaction area.

Providing the interactive environment may further include, if it is determined that adjustment of a size of the at least one individual space is required as a result of comparing the size of the user's body with the size of the virtual object, adjusting the size of the at least one individual space in accordance with the size of the user's body.

The user-workable area may be generated in consideration of at least one of body size information of the user, motion information of the user collected for a preset period, and a body-reachable range measured in accordance with the user.

Creating the at least one individual space may be configured to create the at least one individual space by transforming the virtual space in accordance with at least one of rotation, translation, scale conversion, and projection into N dimensions.

Providing the interactive environment may include detecting a line of sight of the user based on a scheme corresponding to at least one of head tracking and eye tracking; and sensing the displayable range based on the line of sight, and when the displayable range is changed, extracting the intersection area in real time in accordance with the changed displayable range.

Creating the at least one individual space may include rearranging the virtual space into multiple division groups based on a scenario of the virtual content; and creating the at least one individual space by merging the multiple division groups in a sequence of rearrangement.

Providing the interactive environment may further include outputting an event effect that occurs due to the virtual content to the user based on at least one output module.

The virtual space may be at least one of a virtual space defined as a three-dimensional (3D) space and a logical virtual space defined as a multidimensional space having three or more dimensions.

Acquiring the spatial data may be configured to acquire the spatial data based on any one of Internet Process Communication (IPC) and Remote Process Communication (RPC).

In accordance with an aspect of the present invention to accomplish the above objects, there is provided an apparatus for remotely controlling virtual content, including a communication unit for acquiring spatial data about a virtual space; a transform unit for creating at least one individual space by transforming the virtual space in accordance with a user interaction area that corresponds to a user based on the spatial data; a processing unit for visualizing the at least one individual space in the user interaction area and providing an interactive environment which enables an interaction between the user's body and a virtual object included in the at least one individual space; and a control unit for controlling the virtual object in response to a user interaction event occurring in the interactive environment.

The user interaction area may be an intersection area between a user-workable area in which the user's body is taken into consideration and a displayable range of a wearable display worn by the user.

The processing unit may cause the at least one individual space to be included in the user-workable area and visualize a portion of the at least one individual space corresponding to the intersection area.

The processing unit may provide the interactive environment based on a multimodal interaction scheme using the user's body.

The processing unit may be configured to compare a size of the user's body with a size of the virtual object, and if it is determined that a virtual interaction tool is required as a result of comparing the size of the user's body with the size of the virtual object, provide a virtual interaction tool corresponding to the size of the virtual object to the user interaction area.

The processing unit may be configured to, if it is determined that adjustment of a size of the at least one individual space is required as a result of comparing the size of the user's body with the size of the virtual object, adjust the size of the at least one individual space in accordance with the size of the user's body.

The user-workable area may be generated in consideration of at least one of body size information of the user, motion information of the user collected for a preset period, and a body-reachable range measured in accordance with the user.

The transformation unit may create the at least one individual space by transforming the virtual space in accordance with at least one of rotation, translation, scale conversion, and projection into N dimensions.

The processing unit may detect a line of sight of the user based on a scheme corresponding to at least one of head tracking and eye tracking, sense the displayable range based on the line of sight, and when the displayable range is changed, and extract the intersection area in real time in accordance with the changed displayable range.

The transform unit may rearrange the virtual space into multiple division groups based on a scenario of the virtual content, and create the at least one individual space by merging the multiple division groups in a sequence of rearrangement.

The processing unit may output an event effect that occurs due to the virtual content to the user based on at least one output module.

The virtual space may be at least one of a virtual space defined as a three-dimensional (3D) space and a logical virtual space defined as a multidimensional space having three or more dimensions.

The communication unit may acquire the spatial data is configured to acquire the spatial data based on any one of Internet Process Communication (IPC) and Remote Process Communication (RPC).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, embodiments of the present invention will be described in detail with reference to the attached drawings of the present invention.

Figure 1:
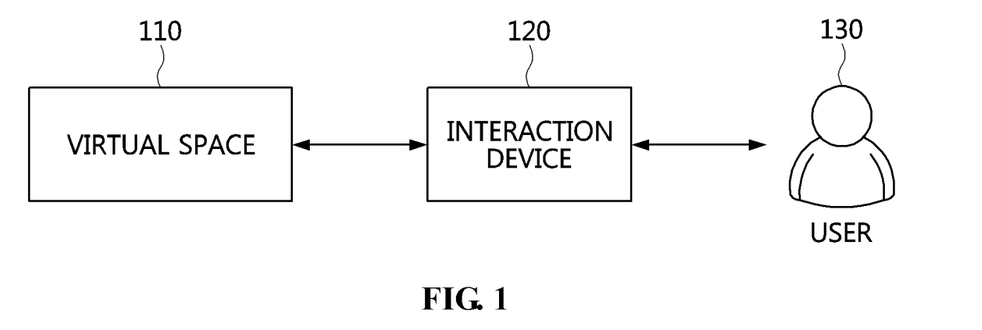
FIG. 1 is a diagram illustrating a system for remotely controlling virtual content according to an embodiment of the present invention.

FIG. 1 is a diagram illustrating a system for remotely controlling virtual content according to an embodiment of the present invention.

Referring to FIG. 1, the system for remotely controlling virtual content (hereinafter referred to as "virtual content remote control system") according to the embodiment of the present invention includes a virtual space 110, an interaction device 120, and a user 130.

Here, the virtual space 110 may be created by virtual content that is being served in a real space that is spatially located far away from the user 130.

That is, in the real space in which the virtual space 110 is being served, users who directly use virtual content in the field may be present.

Here, the user 130 illustrated in FIG. 1 may be a user who uses and experiences virtual content based on a network and at least one of a virtual reality device, an augmented reality device, and a mixed reality device in a place located far away from the real space where virtual content is provided. That is, the user 130 may use the virtual space 110 while sharing the virtual space 110 with the user who directly uses virtual content in a field corresponding to a remote place.

Here, the interaction device 120 may provide the user 130 with an interactive environment in which the user 130 is capable of controlling a virtual object present in the virtual space while interacting with the virtual space 110 depending on the virtual content.

The interaction device 120 may provide an interactive environment in which a user who wears a wearable device, such as a Head-Mounted Display (HMD), is capable of controlling a virtual object by personally using his or her body. That is, the interaction device 120 may provide an environment which the user is capable of intuitively controlling the virtual object using his or her hand, voice or the like without using a controller such as a keyboard, a mouse, or a joystick.

Because such an intuitive interactive environment is provided, the user may more easily experience virtual content and may feel immersion as if he or she were actually immersed in the virtual content.

Here, the interaction device 120 may acquire spatial data about the virtual space, and may then transform the virtual space into an individual space that can be provided as an interactive environment.

The individual space may be created by performing at least one of rotation, translation, scale conversion, and projection into N dimensions in the virtual space.

Here, the virtual space may be rearranged into multiple division groups depending on the scenario of virtual content, and the division groups may be merged depending on the rearrangement sequence thereof to create the individual space.

The individual space may be created in consideration of a user interaction area determined in accordance with the user.

Here, the user interaction area may be a space in which the user is capable of controlling a virtual object by actually using his or her body in the interactive environment provided through the interaction device 120. Therefore, the user interaction area may be a workable area that allows the user to perform a task depending on the body condition of the user, and may be determined depending on a displayable range in which virtual content can be displayed via a wearable display worn by the user.

Therefore, the interaction device 120 may create an individual space by transforming the virtual space into a form that can be optimized for the user interaction area, and the created individual space may be visualized in the user interaction area.

The user 130 may control a virtual object corresponding to virtual content in the individual space visualized in the user interaction area through the wearable display.

Here, the user 130 may interact with the virtual object in a multimodal way using his or her body, and may also control the virtual object through a separate virtual interaction tool in consideration of the ratio of the size of the user's body to the size of the virtual object.

Here, the results of control of the virtual content by the user 130 may be reflected in real time in the virtual content, and thus users who directly use the virtual content in a field corresponding to the real space in which the virtual space 110 is being served may also check the results of control by the user 130.

Further, when a specific event occurs in the virtual space 110 due to users who directly use the virtual content in the field, output related to the event may also be provided to the user 130. When an effect of the event is present, the corresponding event effect may be provided to the user 130 via a separate output device and a separate actuator provided near the user 130.

By means of this virtual content control system, when an online network-based remote participant accesses a virtual reality space, a space in which a participant in the real space recognizes the remote participant and acts with the remote participant may be associated with a remote virtual space, and thus an interface that allows the action of the controlled virtual object and the cognitive level thereof to naturally match between the participants may be provided.

That is, unlike conventional technology, which simply controls an arbitrary object through a controller at a remote place, the user may be possessed into the virtual object, and may then virtually navigate in the virtual space. Further, in a third person mode (e.g. from a god's view or from a bird's view), the user may more easily control events related to the virtual content by closely interacting with other users while observing and controlling all situations in virtual space.

Figure 2:
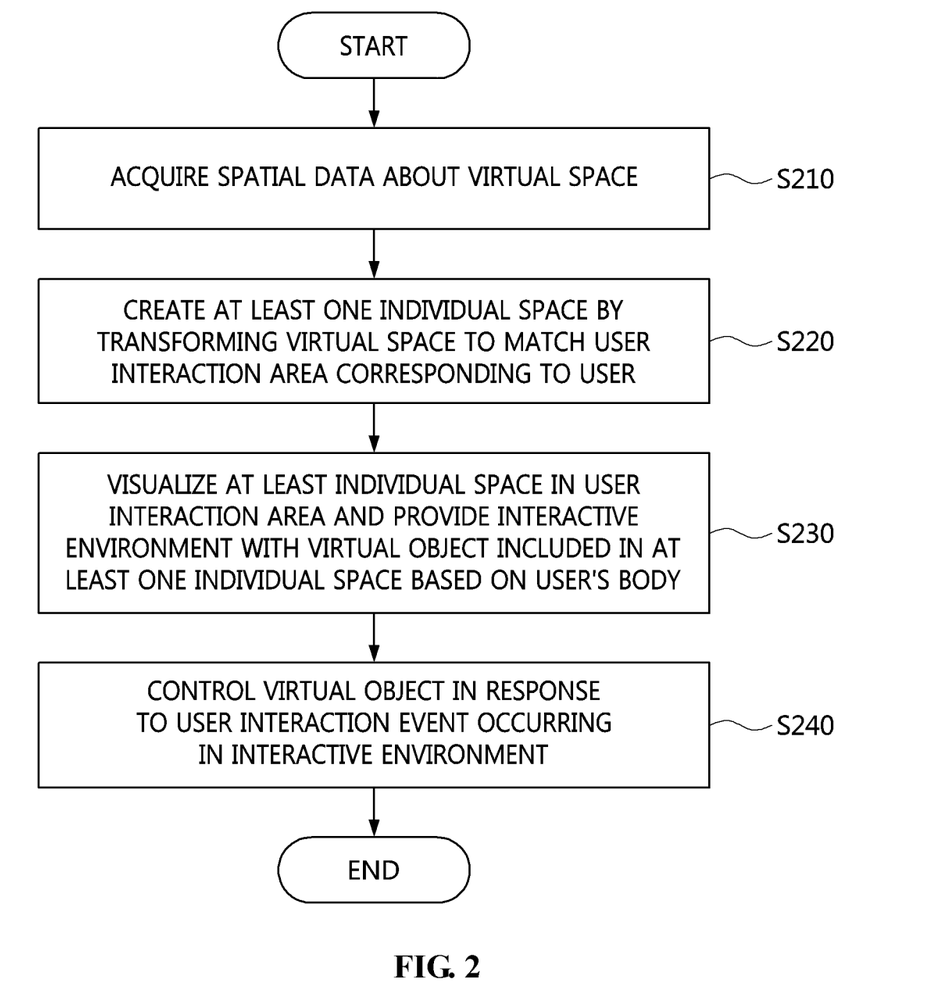
FIG. 2 is an operation flowchart illustrating a method for remotely controlling virtual content according to an embodiment of the present invention.

FIG. 2 is an operation flowchart illustrating a method for remotely controlling virtual content according to an embodiment of the present invention.

Referring to FIG. 2, the virtual content remote control method according to the embodiment of the present invention acquires spatial data about a virtual space at step S210.

Here, a separate communication module may be provided in a real space located at a long distance, and the spatial data may be received through the separate communication module.

Here, the spatial data may be data for configuring the virtual space.

The virtual space may be at least one of a virtual space defined as a three-dimensional (3D) space and a logical virtual space defined as a multidimensional space having three or more dimensions.

Here, as the virtual space, there may be one or more spaces in consideration of the scenario of the virtual content.

The spatial data may be acquired based on any one of Internet Process Communication (IPC) and Remote Process Communication (RPC).

Further, the virtual content remote control method according to the embodiment of the present invention creates at least one individual space by transforming the virtual space to match a user interaction area corresponding to the user based on the spatial data at step S220.

Here, the user interaction area may be an intersection area between a user-workable area in which the body of the user is taken into consideration and the displayable range of a wearable display worn by the user.

The user-workable area may be generated in consideration of at least one of the user's body size information, the user's motion information collected for a preset period, and a body-reachable (or body-accessible) range measured depending on the user.

Therefore, the user-workable area may be set differently for each user, and may be stored and kept such that the user-workable area matches the user's access information.

Here, at least one individual space may be created by transforming the virtual space in accordance with at least one of rotation, translation, scale conversion, and projection into N dimensions.

For example, when the size ratio (scale) of the virtual space is different from that of the user interaction area determined in consideration of the body size of the user, the individual space may be created at a size suitable for the body size of the user through scale conversion.

In another example, when the virtual space is a multidimensional virtual space (having three or more dimensions) that is difficult to represent visually, an individual space projected into N dimensions, which can be visually checked and controlled by the user, may be created.

Here, the virtual space may be rearranged into multiple division groups depending on the scenario of virtual content, and the multiple division groups may be merged depending on the rearrangement sequence thereof to create at least one individual space.

For example, the virtual space may be a multidimensional space that is difficult to represent visually, or may be a space formed at a size that is excessively large or small compared to the body size of the user. Therefore, in order for the user to easily control pieces of virtual content included in various virtual spaces in the user interaction area, rearrangement may be performed in such a way as to convert the dimension of each virtual space or change the size of each virtual space in accordance with the user. That is, the virtual space rearranged and created in this way may be at least one individual space in which the user directly interacts with virtual content.

Further, the virtual content remote control method according to the embodiment of the present invention visualizes the at least one individual space in the user interaction area, and provides an interactive environment which enables interaction between the body of the user and each virtual object included in the at least one individual space at step S230.

Here, the user may visually check the visualized individual space by wearing the wearable display for virtual reality (VR), augmented reality (AR), or mixed reality (MR).

The at least one individual space may be included in the user-workable area, and a portion corresponding to an intersection area between individual spaces may be visualized.

That is, the individual spaces transformed from the virtual space may be included in the user-workable area, and thus the user prepares the individual spaces in a controllable state, but the intersection area corresponding to the displayable range of the wearable display predicted to be actually controlled by the user may be visualized and shown to the user.

Here, the interactive environment may be provided based on a multimodal interaction scheme using the body of the user. For example, an environment in which the virtual object can be controlled may be provided through various types of direct/indirect interaction methods using not only the user's hand or finger, but also the voice, head motion, and line of sight of the user.

Here, the body size of the user may be compared with the size of the virtual object. As a result of the comparison, if it is determined that a virtual interaction tool is required, the virtual interaction tool corresponding to the size of the virtual object may be provided to the interaction area.

That is, when the virtual space is presented as a user interaction area for user interaction, and the virtual space is presented at a ratio different from the user's body size, there may occur a situation of inconvenience in interaction because the ratio of the size of the user's hand or finger to the size of the virtual object is not 1:1. In this case, as an indirect interaction metaphor, a virtual interaction tool may be provided.

Here, the user may overlay (or superimpose) a virtual interaction tool suitable for interaction with the virtual object on a body portion with which the user desires to directly interact with the virtual object, and may then use the virtual interaction tool as a normal tool.

For example, assuming that the virtual space is scaled down and provided as the user interaction area when the user participates in virtual content of a land of pygmies, it may be difficult to select and control a virtual object because the user's hand is much larger than the virtual object. In this case, a small-sized virtual interaction tool suitable for a scaled-down mini world may be visualized and provided to the end of the user's hand. At this time, the virtual interaction tool may be provided such that it is controlled in association with information about the six degrees of freedom of the user's hand (6DOF; x, y, z, pitch, yaw, roll), or such that the control of the detailed location, posture, and mechanical operation of the virtual interaction tool is executed using a method associated with the hand posture, voice, or eye direction command of the user. Through this control, the user may experience a sensation of directly associating a virtual object in the mini world with his or her body portion and interacting with the virtual object, and the virtual content may be represented such that even in the virtual world in virtual content, an event occurs in real time in the state in which the virtual space is naturally associated with the remote space (i.e. through seamless control) and transformed to the size ratio of the remote space.

In another example, it may be assumed that the user participates in virtual content of a land of giants and that a virtual space is too large to be represented in a user interaction area. In this case, a virtual interaction tool having a larger volume than that of a real space may be visualized on the user's hand so that the user is capable of interacting with each virtual object in a huge virtual space, thus enabling direct interaction to be supported.

Here, if it is determined that the adjustment of the size of at least one individual space is required as a result of comparing the body size of the user with the size of the virtual object, the size of the at least one individual space may be adjusted to correspond to the body size of the user.

That is, in the above example, when the user participates in virtual content of a land of giants, the size of the huge virtual space may be scaled-down to the same ratio as the user's body size, and thus the size of the content of the land of giants may be naturally adjusted as if the virtual content were a land of normal persons despite being content of a land of giants, thus enabling interaction to be supported.

The line of sight of the user may be detected based on a scheme corresponding to at least one of head tracking and eye tracking.

Here, a displayable range is detected based on the line of sight, so that, if the displayable range is changed, the intersection area may be extracted in real time depending on the changed displayable range.

Here, an event effect occurring due to the virtual content may be output to the user based on at least one output module.

For example, when the virtual space of virtual content is transformed into a flower garden, the scent of a flower is provided through an output module capable of stimulating the user's sense of smell, and thus immersion may be provided to the user as if the user were present in the flower garden.

Next, the virtual content remote control method according to the embodiment of the present invention controls the virtual object in response to a user interaction event occurring in the interactive environment at step S240.

For example, the user may handle a virtual avatar or control the navigation of a virtual object using his or her hand or finger as though handling a virtual avatar associated with his or her action by manipulating an existing button or joystick.

At this time, the results of control by the user may be reflected in real time in the virtual content, and thus the virtual space in which the results of control are reflected may also be provided to other users who use or experience the virtual content.

Further, the virtual content remote control method according to the embodiment of the present invention stores various types of information generated during the above-described process in a separate storage module.

In this way, the virtual content remote control method may be used, and thus the immersion of users who participate in content depending on virtual reality, augmented reality, or mixed reality at a remote place may be enhanced, with the result that service quality and the level of user satisfaction may be improved.

Also, a high-level experience (presence) which minimizes the difference in presence between the real world and the virtual world may be provided to each user, and the user may intuitively manipulate a virtual object based on multi-sensory information presented around the user himself or herself.

Figure 3:
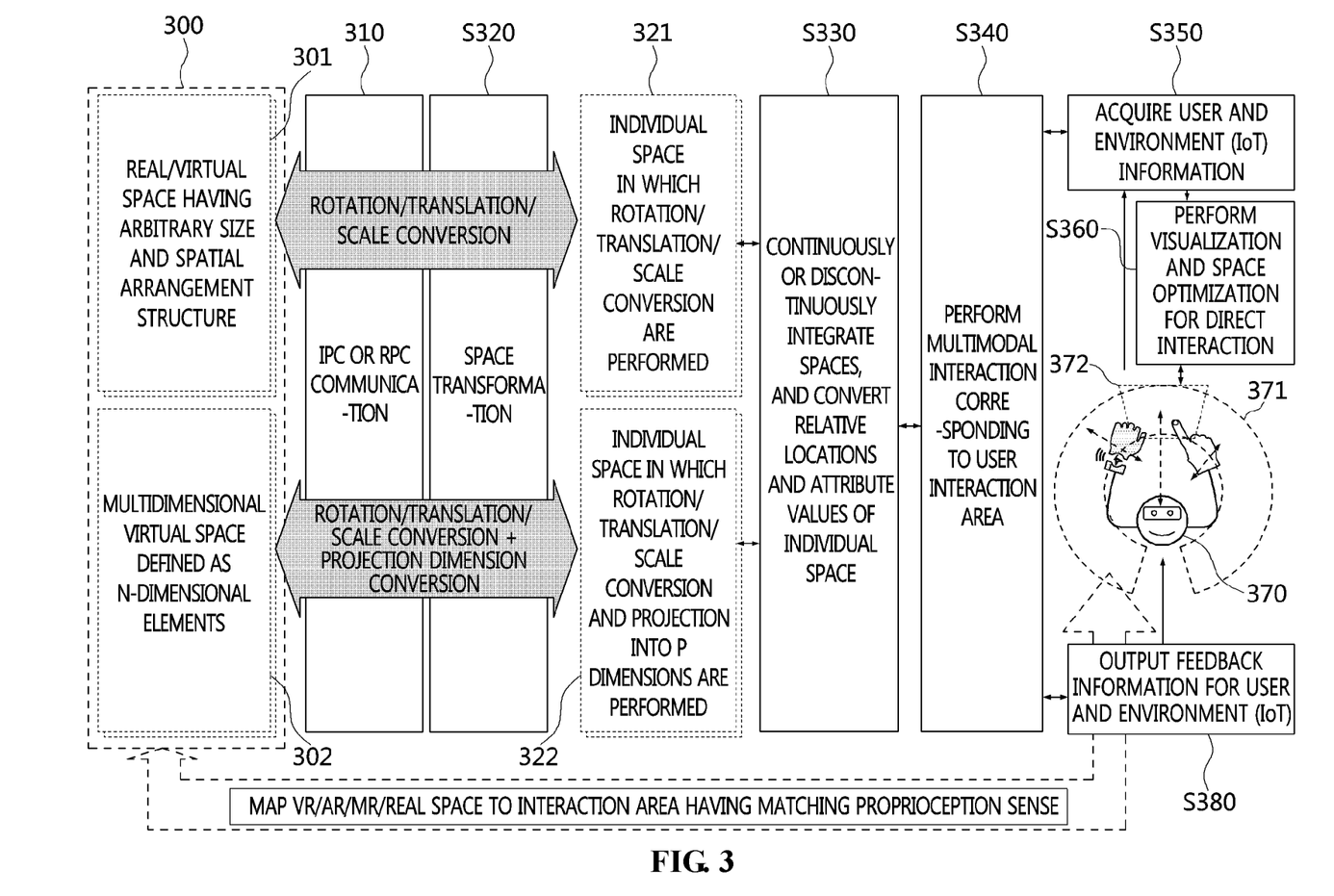
FIG. 3 is a diagram illustrating an example of a process for remotely controlling virtual content according to an embodiment of the present invention.

FIG. 3 is a diagram illustrating an example of a process for remotely controlling virtual content according to the present invention.

Referring to FIG. 3, in order to remotely control virtual content according to the present invention, virtual spaces 301 and 302 present in a real space 300 located far away from a user 370 may be mapped to the interaction space of the user 370 which has a proprioception sense and a visual sense matching the virtual spaces.

Here, as illustrated in FIG. 3, the virtual space 301 or 302 may be a virtual space 301, which is defined as a 3D space through a real space or virtual-reality content having an arbitrary size and an arbitrary spatial arrangement structure, or a logical multidimensional virtual space 302, which is defined as an N-dimensional space having three or more dimensions which cannot be simply visually represented.

An apparatus for remotely controlling virtual content according to an embodiment of the present invention may acquire spatial data corresponding to the virtual spaces 301 and 302 via Internal Process Communication (IPC) or Remote Process Communication (RPC) 310.

For example, a communication module installed in the real space in which the virtual space 301 or 302 is created may transmit spatial data corresponding to the virtual space 301 or 302 to the virtual content remote control apparatus provided in an area (i.e. local space) in which the user 370 is located.

Here, the virtual content remote control apparatus may perform space transformation processing corresponding to at least one of rotation, translation, scale conversion, and projection into P dimensions on the virtual space 301 or 302 in response to a certain predefined rule or an authoring command from the user 370 at step S320, and may transform the virtual space 301 or 302 into an individual space 321 or 322.

Here, the individual spaces 321 and 322 may be created as a single individual space, and the relative locations and attribute values of the created individual space may be converted in accordance with a user interaction area. Also, the individual spaces 321 and 322 may be partially grouped, and respective groups may be continuously or discontinuously integrated and may then be converted in accordance with the user interaction area at step S330.

Here, the individual spaces 321 and 322 are transformed in accordance with the user interaction area as information is transmitted from a remote place to a local place, and relationships of conversion (mapping) between relative locations and attribute values may be defined. Therefore, when information is transmitted in a reverse direction (i.e. from a local place to a remote place; local→remote), the information may be converted (integrated→separated) depending on the relationships of the inverse function thereof.

Thereafter, an environment corresponding to a multi-modal interaction scheme corresponding to the user interaction area may be provided at step S340.

Here, the user interaction area may be determined by acquiring information about the user 370 and the environment around the user (e.g. Internet of Things: IoT) at step S350 and by performing visualization and spatial optimization for direct interaction based on the acquired information at step S360.

Here, in order to use a virtual reality (VR) service, an augmented reality (AR) service or a mixed reality (MR) service, the user 370 who wears a wearable display may perform interaction with a virtual object on the user interaction area, which is an intersection area between a workable area 371 within the range of a near-body space, which is defined as a distance that the user's body can easily reach based on his or her body location, and the displayable range 372 of the wearable display.

The user 370 may interact with the virtual object using direct/indirect multimodal interaction methods, such as the use of the line of sight, head motion, voice or hand gesture, and direct touch and manipulation of a 3D object.

The workable area 371 may be an area falling within a range in which a personal user can operate based on ergonomics.

Here, the displayable range 372 may be a virtual frustum space defined as a field of view.

The virtual content remote control apparatus may acquire information about the behavior of the user 370 or a surrounding environment required for the progress of virtual content based on sensors installed near the user 370, as in the case of an IoT device, and may remotely transmit the acquired information. Further, information about the remote place or a virtual special effect occurring in the field may be transferred to the user 370 through a separate output module (e.g. actuator) at step S380.

Figure 4:
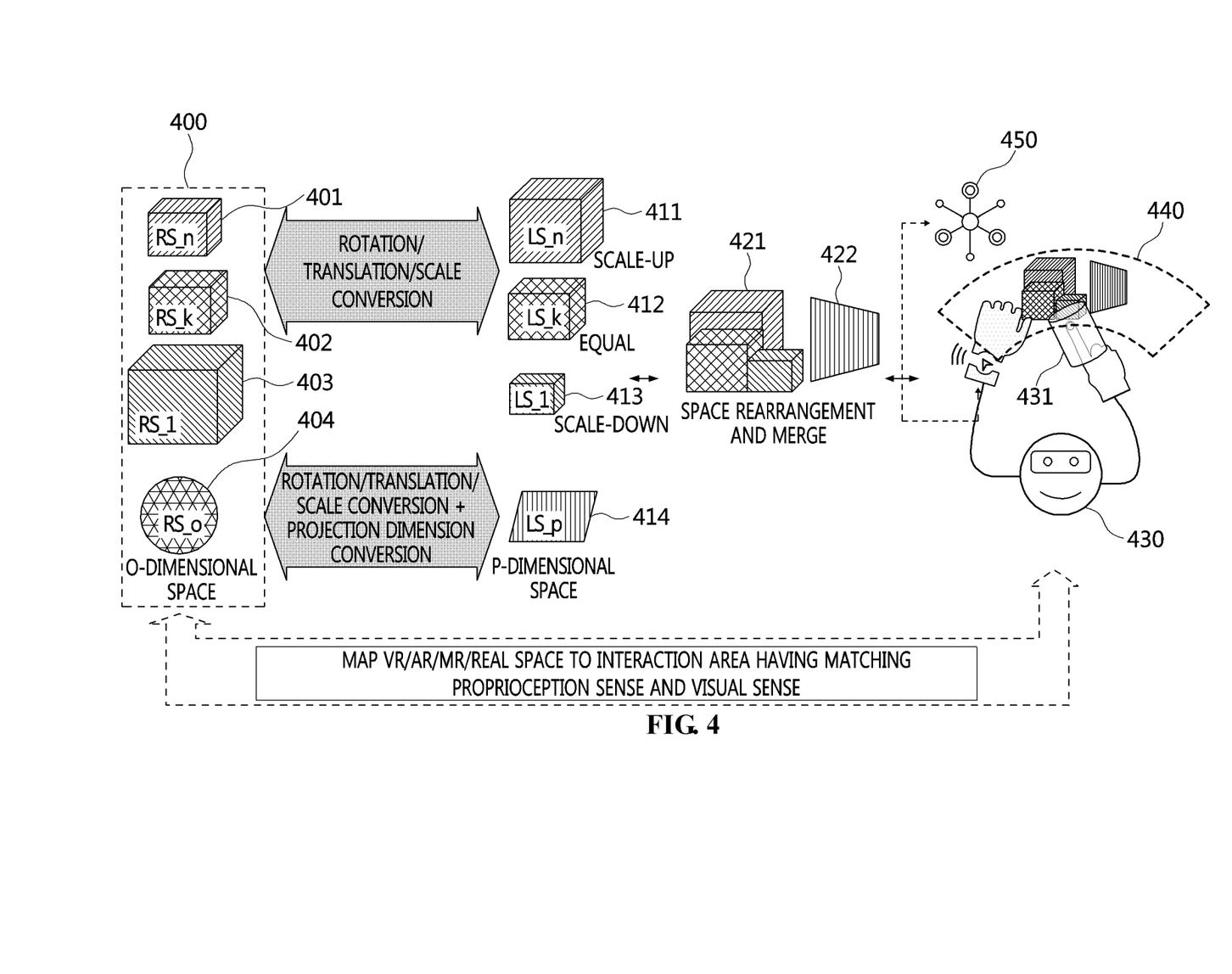
FIG. 4 is a diagram illustrating an example of a space transformation procedure in the virtual content remote control process according to the present invention.

FIG. 4 is a diagram illustrating an example of a space transformation procedure in the process for remotely controlling virtual content according to the present invention.

Referring to FIG. 4, the space transformation procedure according to the present invention may transform multiple virtual spaces 401 to 403 and a space 404, defined as an 0-dimensional space, which are distributed and present in a remote real space 400, and then create transformed spaces 411 to 414.

Thereafter, the respective spaces 411 to 414 may be connected or rearranged into division groups depending on the scenario of virtual content.

Through this procedure, the multiple virtual spaces 401 to 404, present at a remote place, may be transformed such that they fall within a user interaction area 440 in which a user 430 may directly interact with virtual objects.

Here, the user 430 may observe virtual content present in the user interaction area 440, and may directly or indirectly interact with the virtual content. For example, a virtual object included in the virtual content may be selected and manipulated, or alternatively, interaction such as movement between spaces may be performed.

Further, when the user 430 feels a virtual object within the user interaction area 440 or touches and selects the virtual object, the virtual content remote control apparatus according to the present invention may provide a virtual interaction tool 431 suitable for the size level of the virtual object in consideration of the ratio of the size of the user body to the size of the virtual object. That is, when an individual space visualized in the user interaction area 440 is represented in the form of a scaled-down mini-world, the hand of the user 430 seems to be relatively large, and thus it may be difficult to perform direct interaction such as selecting or manipulating a scaled-down virtual object. Therefore, a virtual interaction tool 431 suitable for interaction may be provided such that the user 430 may more easily control the virtual content.

Here, a tool for interaction (i.e. metaphor) may be provided as a scheme for overlaying the virtual interaction tool 431 on the location of the hand or finger of the user 430 or replacing the hand of the user 430 with the virtual interaction tool 431.

When the user 430 performs the interaction of directly controlling a virtual object while observing all of the whole space (world space) of the virtual content in a near-body space defined around the user (i.e. a local space), a scenario of interacting with individual worlds as if a god who took charge of the whole world in the virtual content were present may be naturally produced at a remote place.

In this case, the virtual content remote control apparatus may enhance the immersion of the user 430 by providing the user 430 with the effect of an event occurring in the virtual content through an output module, such as an IoT sensor actuator 450.

Figure 5:
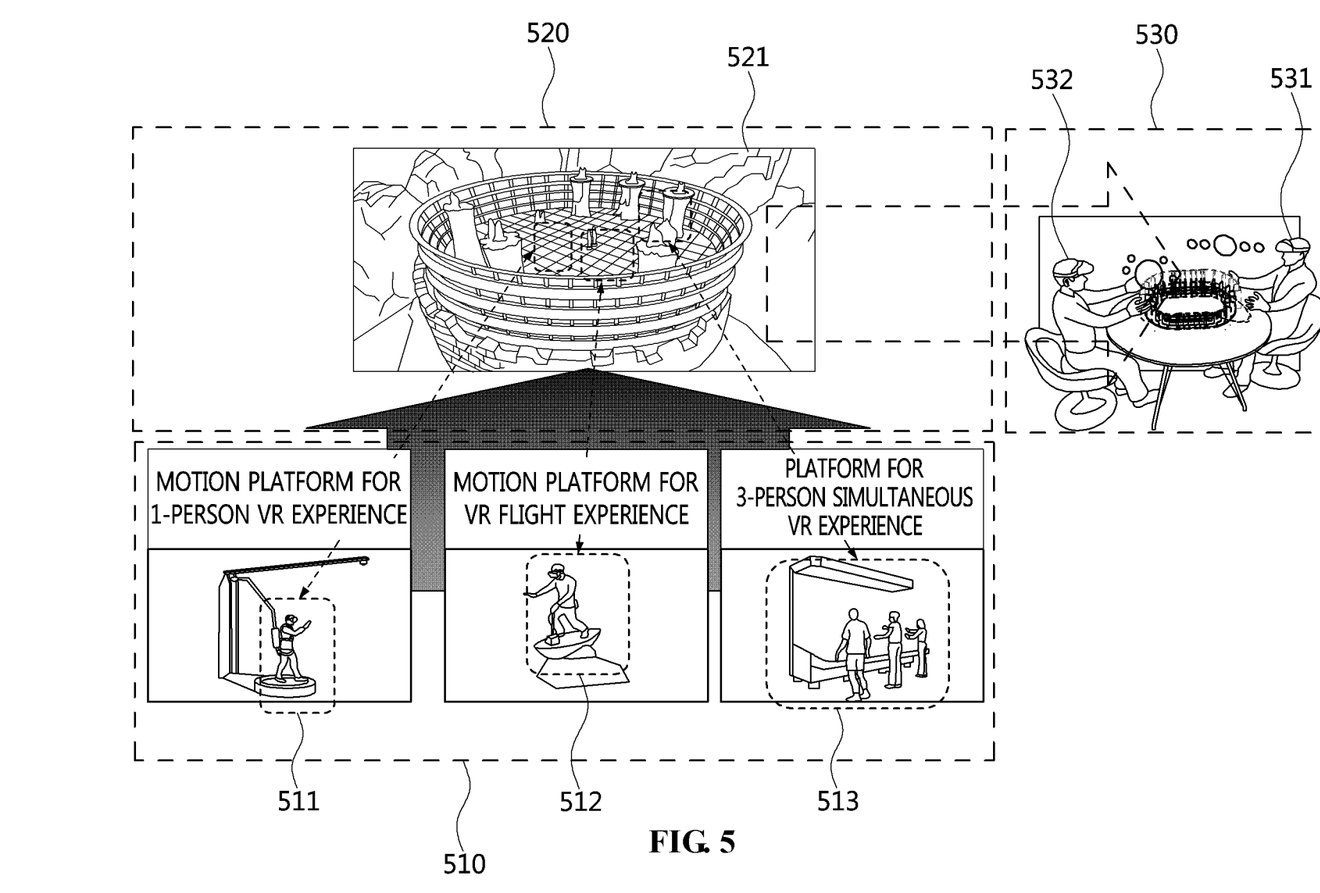
FIGS. 5 and 6 are diagrams illustrating an example of implementation of the system for remotely controlling virtual content according to the present invention.
Figure 6:
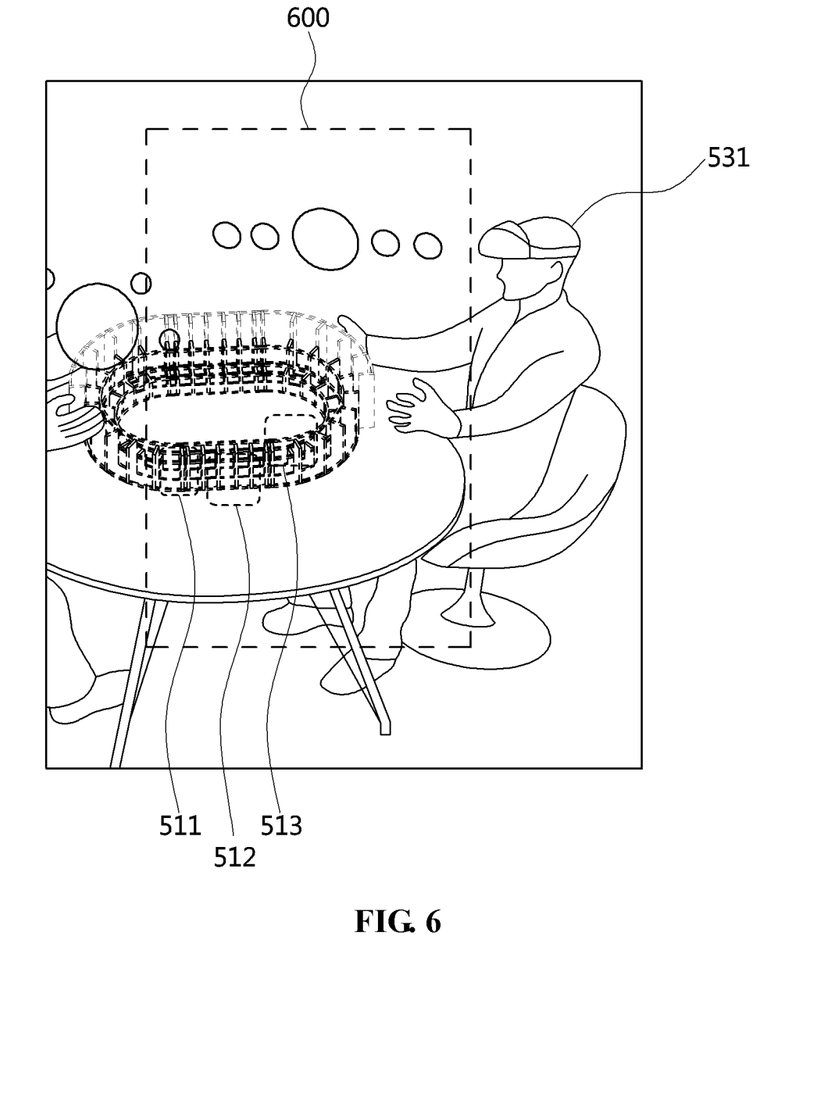

FIGS. 5 and 6 are diagrams illustrating examples of implementation of a system for remotely controlling virtual content according to the present invention.

Referring to FIGS. 5 and 6, field (local) users 511 to 513, who participate in a virtual battle field game over an online network through a plurality of homogeneous and heterogeneous virtual reality experience systems, and pieces of service content may be present in a real space 510 located at a long distance.

When remote users 531 and 532, who are the main entities utilizing the present invention, wear display glasses for virtual reality, augmented reality or mixed reality service, the size of interactive VR content 520 that is being served at the remote place at that time is scaled down to such an extent that the current state of the VR content 520 falls within the range of the near-body spaces of the remote users 531 and 532, and thus a situation is provided in which the VR content can be observed through natural location movement and intuitive viewpoint movement.

Here, individual spaces and actions of the local users 511 to 513 who use a distributed game system at the remote place may be represented in a single specific virtual space 521 in the interactive VR content 520, and the situation of the interactive VR content may be reproduced in real time in the form of a mini-world in a user interaction area 600 for the remote users 531 and 532, as illustrated in FIG. 6.

In order to interact with multiple other participants in the single specific virtual space 521 or with a virtual object in the game, the remote user 531 may directly take and move the virtual object in the user interaction area 600 or may input a command through a 3D graphical interface menu (3D user interface), a gesture, a voice interface, or a sensor disposed in the environment.

Also, physical special effects such as collisions, light, wind, sound, and odors, which may occur due to the virtual space included in the interactive VR content 520, may be provided through a smart band or a haptic suit, which is worn by the user 531, and a five-sense interface and an actuator (e.g. a vibrating chair, a cool/warm heat generator, an odor-emitting device, or the like), which are present near the user 531.

Figure 7:
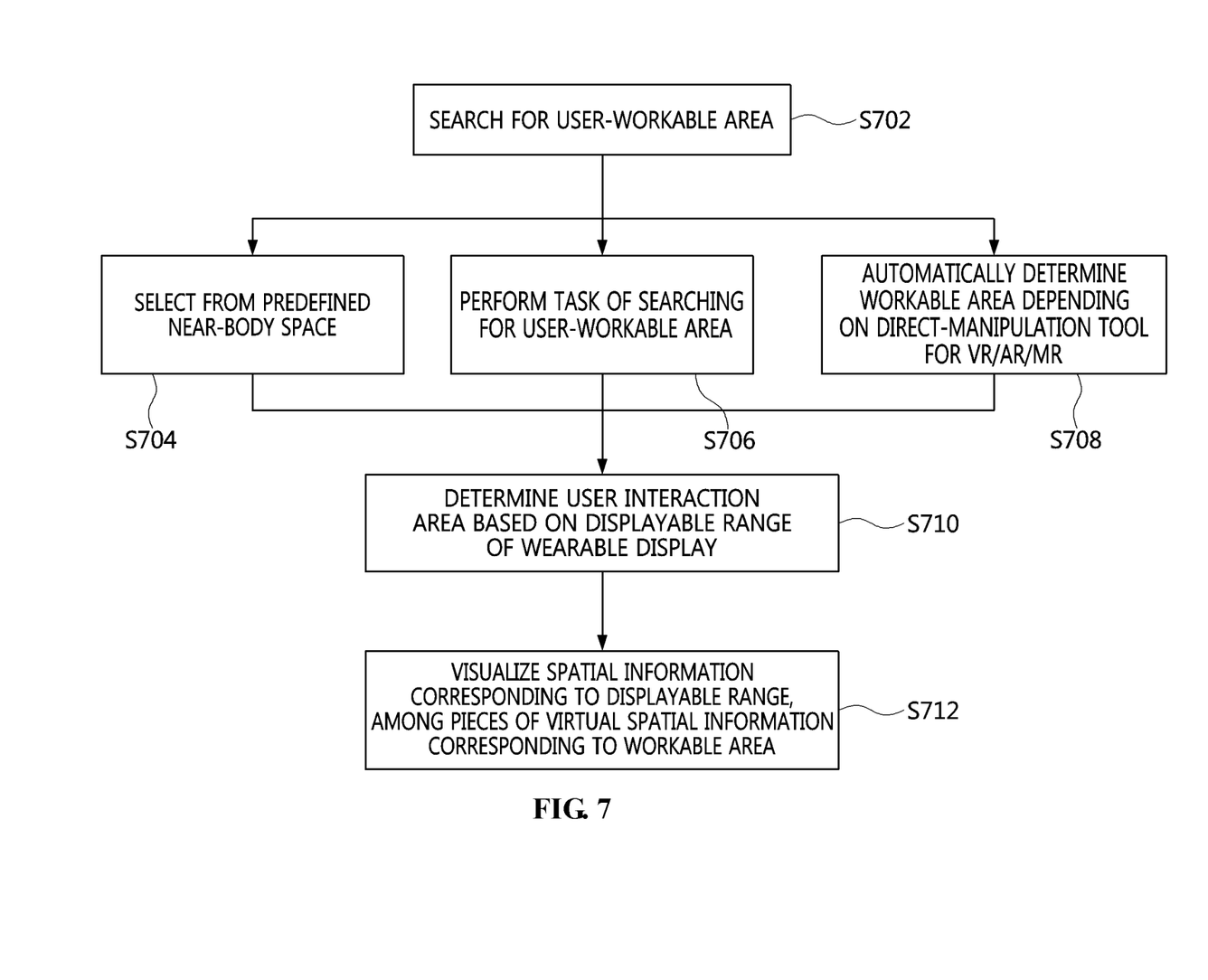
FIG. 7 is a diagram illustrating an example of a procedure for determining and visualizing a user interaction area according to the present invention.

FIG. 7 is a diagram illustrating an example of a procedure for determining and visualizing a user interaction area according to the present invention.

Referring to FIG. 7, a task of setting a user interaction area in which the user is capable of directly interacting with a virtual object using his or her body may be performed according to the present invention.

Here, a workable area which the user having specific body size information can naturally reach may be searched for based on ergonomic methodology at step S702.

Here, the workable area may be selected through a command input interface (e.g. a 2D graphical user interface (2DGUI), a 3DGUI, a button, or voice command) by selecting a sub-space (sub-set) previously designed to be suitable for the scenario of the virtual content based on a basically defined space (super-set) from a predefined near-body space at step S704.

Alternatively, since the workable area may vary according to the body size of the user, a workable area may be defined by performing a procedure for searching for a user-workable space in order to consider various body size conditions depending on the user in real time at step S706.

For example, the workable area may be defined in such a way as to extract the user's body-reachable range by allowing the user to take a promised action (a set of a series of postures for extracting the operating range of the user in ergonomic research) through a sensor for tracking the spatial location of the user's hand or finger or by inducing the user to freely take body motion for a predetermined period of time. Further, the workable area may be defined in such a way as to extract the user's body-reachable range using a method for audio visually applying a specific stimulation to a location requiring interaction depending on the scenario of the virtual content and for allowing the user to directly touch the corresponding location.

Alternatively, the workable area may be automatically determined depending on a direct-manipulation tool for virtual reality (VR), augmented reality (AR) or mixed reality (MR) at step S708.

When at least one of the above-described steps S704, S706, and S708 is performed, a workable area (an atypical 3D space volume) specialized for the current user may be acquired.

Thereafter, in order to associate the same with the viewpoint of the user, a user interaction area may be determined from the workable area based on the displayable range of the wearable display worn by the user at step S710.

In this case, in consideration of the field of view of the wearable display worn by the user, spatial information corresponding to the displayable range, among pieces of virtual spatial information corresponding to the workable area, may be visualized and shown based on information in head tracking or eye tracking at step S712.

Figure 8:
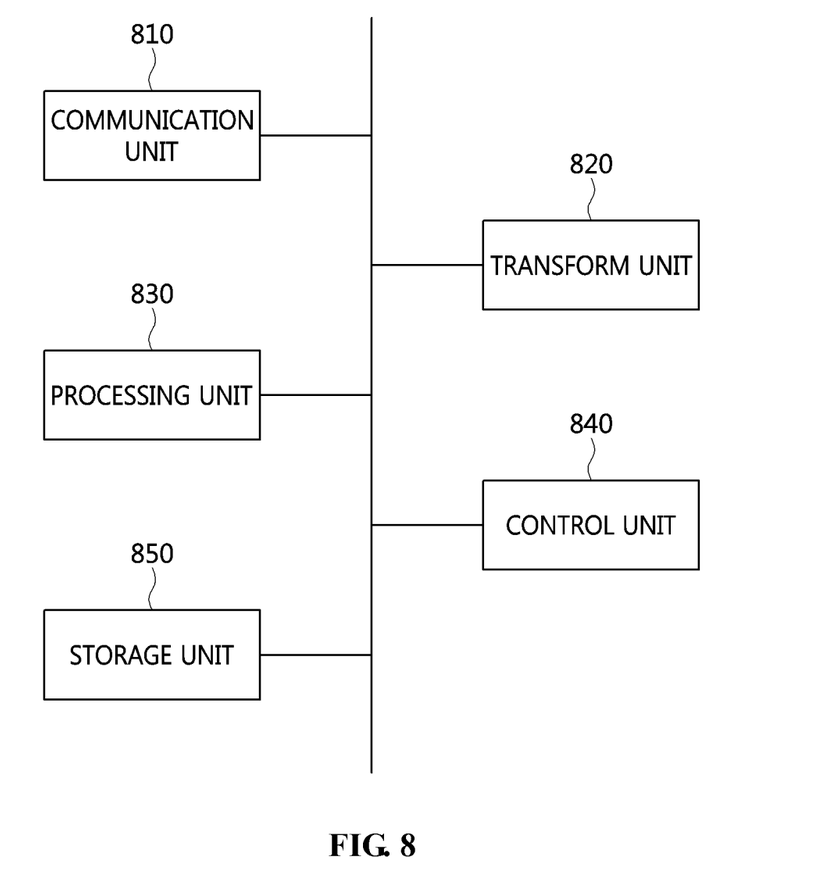
FIG. 8 is a block diagram illustrating an apparatus for remotely controlling virtual content according to an embodiment of the present invention.

FIG. 8 is a block diagram illustrating an apparatus for remotely controlling virtual content according to an embodiment of the present invention.

Referring to FIG. 8, the virtual content remote control apparatus according to the embodiment of the present invention includes a communication unit 810, a transform unit 820, a processing unit 830, a control unit 840, and a storage unit 850.

The communication unit 810 acquires spatial data about a virtual space.

Here, a separate communication module may be provided in a real space located at a long distance, and the spatial data may be received through the separate communication module.

Here, the spatial data may be data for configuring the virtual space.

The virtual space may be at least one of a virtual space defined as a three-dimensional (3D) space and a logical virtual space defined as a multidimensional space having three or more dimensions.

Here, as the virtual space, there may be one or more spaces in consideration of the scenario of the virtual content.

The spatial data may be acquired based on any one of Internet Process Communication (IPC) and Remote Process Communication (RPC).

The transform unit 820 creates at least one individual space by transforming the virtual space in accordance with a user interaction area suitable for the user based on the spatial data.

Here, the user interaction area may be an intersection area between a user-workable area in which the body of the user is taken into consideration and the displayable range of a wearable display worn by the user.

The user-workable area may be generated in consideration of at least one of the user's body size information, the user's motion information collected for a preset period, and a body-reachable (or body-accessible) range measured depending on the user.

Therefore, the user-workable area may be set differently for each user, and may be stored and kept such that the user-workable area matches the user's access information.

Here, at least one individual space may be created by transforming the virtual space in accordance with at least one of rotation, translation, scale conversion, and projection into N dimensions.

For example, when the size ratio (scale) of the virtual space is different from that of the user interaction area determined in consideration of the body size of the user, the individual space may be created at a size suitable for the body size of the user through scale conversion.

In another example, when the virtual space is a multidimensional virtual space (having three or more dimensions) that is difficult to represent visually, an individual space projected into N dimensions, which can be visually checked and controlled by the user, may be created.

Here, the virtual space may be rearranged into multiple division groups depending on the scenario of virtual content, and the multiple division groups may be merged depending on the rearrangement sequence thereof to create at least one individual space.

For example, the virtual space may be a multidimensional space that is difficult to represent visually, or may be a space formed at a size that is excessively large or small compared to the body size of the user. Therefore, in order for the user to easily control pieces of virtual content included in various virtual spaces in the user interaction area, rearrangement may be performed in such a way as to convert the dimension of each virtual space or change the size of each virtual space in accordance with the user. That is, the virtual space rearranged and created in this way may be at least one individual space in which the user directly interacts with virtual content.

The processing unit 830 visualizes the at least one individual space in the user interaction area, and provides an interactive environment which enables interaction between the body of the user and a virtual object included in the at least one individual space.

Here, the user may visually check the visualized individual space by wearing the wearable display for virtual reality (VR), augmented reality (AR), or mixed reality (MR).

The at least one individual space may be included in the user-workable area, and a portion corresponding to an intersection area between individual spaces may be visualized.

That is, the individual spaces transformed from the virtual space may be included in the user-workable area, and thus the user prepares the individual spaces in a controllable state, but the intersection area corresponding to the displayable range of the wearable display predicted to be actually controlled by the user may be visualized and shown to the user.

Here, the interactive environment may be provided based on a multimodal interaction scheme using the body of the user. For example, an environment in which the virtual object can be controlled may be provided through various types of direct/indirect interaction methods using not only the user's hand or finger, but also the voice, head motion, and line of sight of the user.

Here, the body size of the user may be compared with the size of the virtual object. As a result of the comparison, if it is determined that a virtual interaction tool is required, the virtual interaction tool corresponding to the size of the virtual object may be provided to the interaction area.

That is, when the virtual space is presented as a user interaction area for user interaction, and the virtual space is presented at a ratio different from the user's body size, there may occur a situation of inconvenience in interaction because the ratio of the size of the user's hand or finger to the size of the virtual object is not 1:1. In this case, as an indirect interaction metaphor, a virtual interaction tool may be provided.

Here, the user may overlay (or superimpose) a virtual interaction tool suitable for interaction with the virtual object on a body portion with which the user desires to directly interact with the virtual object, and may then use the virtual interaction tool as a normal tool.

For example, assuming that the virtual space is scaled down and provided as the user interaction area when the user participates in virtual content of a land of pygmies, it may be difficult to select and control a virtual object because the user's hand is much larger than the virtual object. In this case, a small-sized virtual interaction tool suitable for a scaled-down mini world may be visualized and provided to the end of the user's hand. At this time, the virtual interaction tool may be provided such that it is controlled in association with information about the six degrees of freedom of the user's hand (6DOF; x, y, z, pitch, yaw, roll), or such that the control of the detailed location, posture, and mechanical operation of the virtual interaction tool is executed using a method associated with the hand posture, voice, or eye direction command of the user. Through this control, the user may experience a sensation of directly associating a virtual object in the mini world with his or her body portion and interacting with the virtual object, and the virtual content may be represented such that even in the virtual world in virtual content, an event occurs in real time in the state in which the virtual space is naturally associated with the remote space (i.e. through seamless control) and transformed to the size ratio of the remote space.

In another example, it may be assumed that the user participates in virtual content of a land of giants and that a virtual space is too large to be represented in a user interaction area. In this case, a virtual interaction tool having a larger volume than that of a real space may be visualized on the user's hand so that the user is capable of interacting with each virtual object in a huge virtual space, thus enabling direct interaction to be supported.

Here, if it is determined that the adjustment of the size of at least one individual space is required as a result of comparing the body size of the user with the size of the virtual object, the size of the at least one individual space may be adjusted to correspond to the body size of the user.

That is, in the above example, when the user participates in virtual content of a land of giants, the size of the huge virtual space may be scaled-down to the same ratio as the user's body size, and thus the size of the content of the land of giants may be naturally adjusted as if the virtual content were a land of normal persons despite being content of a land of giants, thus enabling interaction to be supported.

The line of sight of the user may be detected based on a scheme corresponding to at least one of head tracking and eye tracking.

Here, a displayable range is detected based on the line of sight, so that, if the displayable range is changed, the intersection area may be extracted in real time depending on the changed displayable range.

Here, an event effect occurring due to the virtual content may be output to the user based on at least one output module.

For example, when the virtual space of virtual content is transformed into a flower garden, the scent of a flower is provided through an output module capable of stimulating the user's sense of smell, and thus immersion may be provided to the user as if the user were present in the flower garden.

The control unit 840 controls the virtual object in response to a user interaction event occurring in the interactive environment.

For example, the user may handle a virtual avatar or control the navigation of a virtual object using his or her hand or finger as though handling a virtual avatar associated with his or her action by manipulating an existing button or joystick.

At this time, the results of control by the user may be reflected in real time in the virtual content, and thus the virtual space in which the results of control are reflected may also be provided to other users who use or experience the virtual content.

The storage unit 850 stores various types of information produced in the virtual content remote control process according to the embodiment of the present invention.

In accordance with an embodiment, the storage unit 850 may be configured independently of the virtual content remote control apparatus, and may then support a function for remotely controlling virtual content. Here, the storage unit 850 may function as a separate large-capacity storage, and may include a control function for performing operations.

Meanwhile, the virtual content remote control apparatus may be equipped with memory, and may then store information therein. In an embodiment, the memory may be a computer-readable medium. In an embodiment, the memory may be a volatile memory unit, and in another embodiment, the memory may be a nonvolatile memory unit. In an embodiment, a storage device may be a computer-readable medium. In various different embodiments, the storage device may include, for example, a hard disk device, an optical disk device, or any other types of large-capacity storage devices.

By means of this virtual content remote control apparatus, the immersion of users who participate in content depending on virtual reality, augmented reality, or mixed reality at a remote place may be enhanced, and thus service quality and the level of user satisfaction may be improved.

Also, a high-level experience (presence) which minimizes the difference in presence between the real world and the virtual world may be provided to each user, and the user may intuitively manipulate a virtual object based on multi-sensory information presented around the user himself or herself.

In accordance with the present invention, the immersion of users who participate in content depending on virtual reality, augmented reality, and mixed reality at a remote place may be enhanced, and thus service quality and the satisfaction of users may be improved.

Further, the present invention may provide a user with a high-level experience (presence) which minimizes the difference in presence between a real world and a virtual world.

Further, the present invention may provide an environment in which a user may intuitively manipulate a virtual object based on multi-sensory information presented around the user.

Furthermore, the present invention may provide a sensation such that a field (local) user, who uses virtual content in a field, and a remote user have the impression of using the virtual content in the same space through a motion platform for the virtual content.

In addition, the present invention may provide interactive technology, which can provide convenience to a user so that a separate learning process for new technology or a new interface is not required in order to use virtual content.

As described above, in the method for remotely controlling virtual content and the apparatus for the method according to the present invention, the configurations and schemes in the above-described embodiments are not limitedly applied, and some or all of the above embodiments can be selectively combined and configured such that various modifications are possible.

What is claimed is:

1. A method for remotely controlling virtual content, comprising:
    acquiring spatial data about a virtual space;
    creating at least one individual space by transforming the virtual space in accordance with a user interaction area that corresponds to a user based on the spatial data;
    visualizing the at least one individual space in the user interaction area and providing an interactive environment which enables an interaction between the user's body and a virtual object included in the at least one individual space; and
    controlling the virtual object in response to a user interaction event occurring in the interactive environment,
    wherein providing the interactive environment comprises comparing a size of the user's body with a size of the virtual object and if it is determined that a virtual interaction tool is required as a result of comparing the size of the user's body with the size of the virtual object, providing a virtual interaction tool corresponding to the size of the virtual object to the user interaction area.

2. The method of claim 1, wherein the user interaction area is an intersection area between a user-workable area in which the user's body is taken into consideration and a displayable range of a wearable display worn by the user.

3. The method of claim 2, wherein providing the interactive environment is configured to cause the at least one individual space to be included in the user-workable area and visualize a portion of the at least one individual space corresponding to the intersection area.

4. The method of claim 3, wherein providing the interactive environment comprises:
    detecting a line of sight of the user based on a scheme corresponding to at least one of head tracking and eye tracking; and
    sensing the displayable range based on the line of sight, and when the displayable range is changed, extracting the intersection area in real time in accordance with the changed displayable range.

5. The method of claim 2, wherein the user-workable area is generated in consideration of at least one of body size information of the user, motion information of the user collected for a preset period, and a body-reachable range measured in accordance with the user.

6. The method of claim 1, wherein providing the interactive environment is configured to provide the interactive environment based on a multimodal interaction scheme using the user's body.

7. The method of claim 1, wherein providing the interactive environment further comprises, if it is determined that adjustment of a size of the at least one individual space is required as a result of comparing the size of the user's body with the size of the virtual object, adjusting the size of the at least one individual space in accordance with the size of the user's body.

8. The method of claim 1, wherein creating the at least one individual space is configured to create the at least one individual space by transforming the virtual space in accordance with at least one of rotation, translation, scale conversion, and projection into N dimensions.

9. The method of claim 1, wherein creating the at least one individual space comprises:
    rearranging the virtual space into multiple division groups based on a scenario of the virtual content; and
    creating the at least one individual space by merging the multiple division groups in a sequence of rearrangement.

10. The method of claim 1, wherein providing the interactive environment further comprises outputting an event effect that occurs due to the virtual content to the user based on at least one output module.

11. The method of claim 1, wherein the virtual space is at least one of a virtual space defined as a three-dimensional (3D) space and a logical virtual space defined as a multidimensional space having three or more dimensions.

12. The method of claim 1, wherein acquiring the spatial data is configured to acquire the spatial data based on any one of Internet Process Communication (IPC) and Remote Process Communication (RPC).

13. An apparatus for remotely controlling virtual content, comprising:
    a communication unit for acquiring spatial data about a virtual space;
    a transform unit for creating at least one individual space by transforming the virtual space in accordance with a user interaction area that corresponds to a user based on the spatial data;
    a processing unit for visualizing the at least one individual space in the user interaction area and providing an interactive environment which enables an interaction between the user's body and a virtual object included in the at least one individual space; and
    a control unit for controlling the virtual object in response to a user interaction event occurring in the interactive environment,
    wherein the processing unit is configured to compare a size of the user's body with a size of the virtual object, and if it is determined that a virtual interaction tool is required as a result of comparing the size of the user's body with the size of the virtual object, provide a virtual interaction tool corresponding to the size of the virtual object to the user interaction area.

14. The apparatus of claim 13, wherein the user interaction area is an intersection area between a user-workable area in which the user's body is taken into consideration and a displayable range of a wearable display worn by the user.

15. The apparatus of claim 14, wherein the processing unit causes the at least one individual space to be included in the user-workable area and visualizes a portion of the at least one individual space corresponding to the intersection area.

16. The apparatus of claim 13, wherein the processing unit provides the interactive environment based on a multimodal interaction scheme using the user's body.

17. The apparatus of claim 13, wherein the processing unit is configured to, if it is determined that adjustment of a size of the at least one individual space is required as a result of comparing the size of the user's body with the size of the virtual object, adjust the size of the at least one individual space in accordance with the size of the user's body.

18. The apparatus of claim 13, wherein the transformation unit creates the at least one individual space by transforming the virtual space in accordance with at least one of rotation, translation, scale conversion, and projection into N dimensions.

* * * * *